US008475264B2

(12) United States Patent
Bytnar et al.

(10) Patent No.: US 8,475,264 B2
(45) Date of Patent: Jul. 2, 2013

(54) WAGERING GAME MACHINE UPGRADE AND ROLLBACK

(75) Inventors: Michael R. Bytnar, Naperville, IL (US); Ranjan Dasgupta, Naperville, IL (US); Craig J. Sylla, Round Lake, IL (US)

(73) Assignee: WMS Gaming Inc., Waukegan, IL (US)

( * ) Notice: Subject to any disclaimer, the term of this patent is extended or adjusted under 35 U.S.C. 154(b) by 324 days.

(21) Appl. No.: 12/864,024

(22) PCT Filed: Jan. 27, 2009

(86) PCT No.: PCT/US2009/000527

§ 371 (c)(1), (2), (4) Date: Jul. 22, 2010

(87) PCT Pub. No.: WO2009/097106

PCT Pub. Date: Aug. 6, 2009

(65) Prior Publication Data

US 2010/0298043 A1 Nov. 25, 2010

Related U.S. Application Data

(60) Provisional application No. 61/024,090, filed on Jan. 28, 2008.

(51) Int. Cl.
*A63F 9/24* (2006.01)
*G06F 17/30* (2006.01)

(52) U.S. Cl.
USPC .................. 463/24; 463/43; 463/16; 463/29; 707/610; 707/649; 707/679; 707/684

(58) Field of Classification Search
USPC ................. 463/16, 24, 43, 29; 707/609, 610, 707/621, 640, 644, 649, 674, 675, 679, 684; 717/171
See application file for complete search history.

(56) References Cited

U.S. PATENT DOCUMENTS

| | | | | |
|---|---|---|---|---|
| 5,505,449 | A | 4/1996 | Eberhardt et al. | |
| 2007/0167210 | A1 | 7/2007 | Kelly et al. | |
| 2008/0009344 | A1 | 1/2008 | Graham et al. | |
| 2008/0207327 | A1 * | 8/2008 | Van Luchene et al. | 463/42 |

OTHER PUBLICATIONS

Neeta Garimella, Apr. 26, 2006, IBM, "Understanding and exploiting snapshot technology for data protection, Part 1: Snapshot technology overview".*
Neeta Garimella, Apr. 26, 2006, IBM, "Understanding and exploiting snapshot technology for data protection, Part 2: Protecting data using snapshot and IBM Tivoli Storage Manager".*
"International Application Serial No. PCT/US2009/000527, International Search Report mailed Mar. 23, 2009", 4 pgs.
"International Application Serial No. PCT/US2009/000527, Written Opinion mailed Mar. 23, 2009", 6 pgs.

* cited by examiner

*Primary Examiner* — Damon Pierce
(74) *Attorney, Agent, or Firm* — Schwegman Lundberg & Woessner, P.A.

(57) ABSTRACT

Systems and methods provide for the selective backup and rollback of software, firmware and data components of a wagering game machine.

19 Claims, 7 Drawing Sheets

WAGERING GAME MACHINE UPGRADE AND ROLLBACK

RELATED APPLICATION

This patent application is a U.S. National Stage Filing under 35 U.S.C. 371 from International Patent Application Serial No. PCT/US2009/000527, filed Jan. 27, 2009, and published on Aug. 6, 2009, as WO 2009/097106 A1 which claims the priority benefit of U.S. Provisional Patent Application Ser. No. 61/024,090 filed Jan. 28, 2008 and entitled "WAGERING GAME MACHINE UPGRADE AND ROLLBACK SYSTEMS AND METHODS", the contents of which are incorporated herein by reference in their entirety.

FIELD

The embodiments relate generally to wagering game machines and more particularly to upgrading and rolling back software and firmware changes on wagering game machines.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright© 2008, 2009, WMS Gaming Inc. All Rights Reserved.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering game content. In order to maintain player interest, wagering game machine makers frequently update wagering game content with new game themes, game settings, bonus events, game software, and other electronic data. Further, entertainment value may be increased by providing an enhanced visual game play experience. Additionally, wagering games may be presented on a variety of differing wagering game platforms, each having different display characteristics.

DETAILED DESCRIPTION

Figure 1:
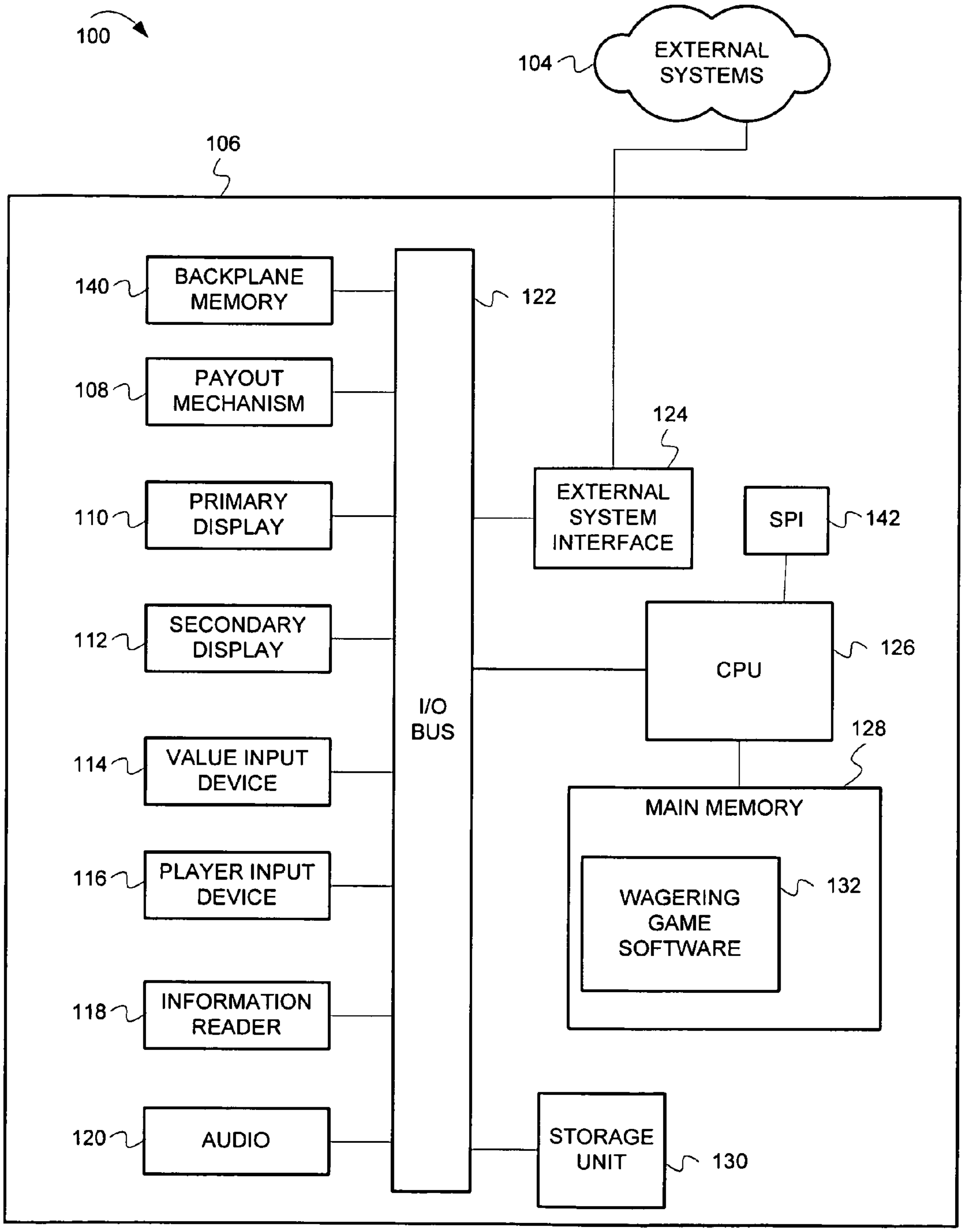
FIG. 1 is a block diagram of an architecture, including a control system, for a wagering game machine according to an example embodiment.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

In general, the system and method embodiments described below illustrate the selective snapshot and rollback of wagering game machine software and data. The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

FIG. 1 is a block diagram illustrating a wagering game machine architecture 100, including a control system, according to example embodiments of the invention. As shown in FIG. 1, the wagering game machine 106 includes a central processing unit (processor) 126 connected to main memory

128, which may store wagering game software 132. In one embodiment, the wagering game software can include software associated with presenting wagering games, such as video poker, video black jack, video slots, video lottery, etc., in whole or part. In addition, wagering game software 132 may include bonus rounds, themes, advertising content, attract mode content, pay tables, denomination tables, audio files, video files, operating system files and other software associated with a wagering game or the operation of a wagering game machine.

The processor 126 is also connected to an input/output (I/O) bus 122, which facilitates communication between the wagering game machine's components. The I/O bus 122 may be connected to a payout mechanism 108, primary display 110, secondary display 112, value input device 114, player input device 116, information reader 118, and/or storage unit 130. The player input device 116 can include the value input device 114 to the extent the player input device 116 is used to place wagers. The I/O bus 122 may also be connected to an external system interface 124, which is connected to external systems 104 (e.g., wagering game networks).

Storage unit 130 may be any type of device that can persistently store data. Examples of such devices include but are not limited to hard drives, DVD drives, flash memory, compact flash memory, various types of NVRAM (Non-volatile RAM) etc. The embodiments are not limited to any particular type of storage unit. Storage unit 130 may be used to store wagering game software, operating system software, BIOS software etc.

In some embodiments, wagering game machine 106 may include backplane memory 140 and SPI (Serial Peripheral Interface) 142. Backplane memory 140 may include memory that stores a serial number for the system, meter data for the system, and other may include other types of specialized data for the system.

SPI 142 in some embodiments provides an interface to memory that may be used to store data such as jurisdictional data that may be used to provide identification data regarding the regulatory jurisdiction for the wagering game machine and other jurisdictional dependent data. The memory may also store bet limit and/or win limit data.

Figure 3:
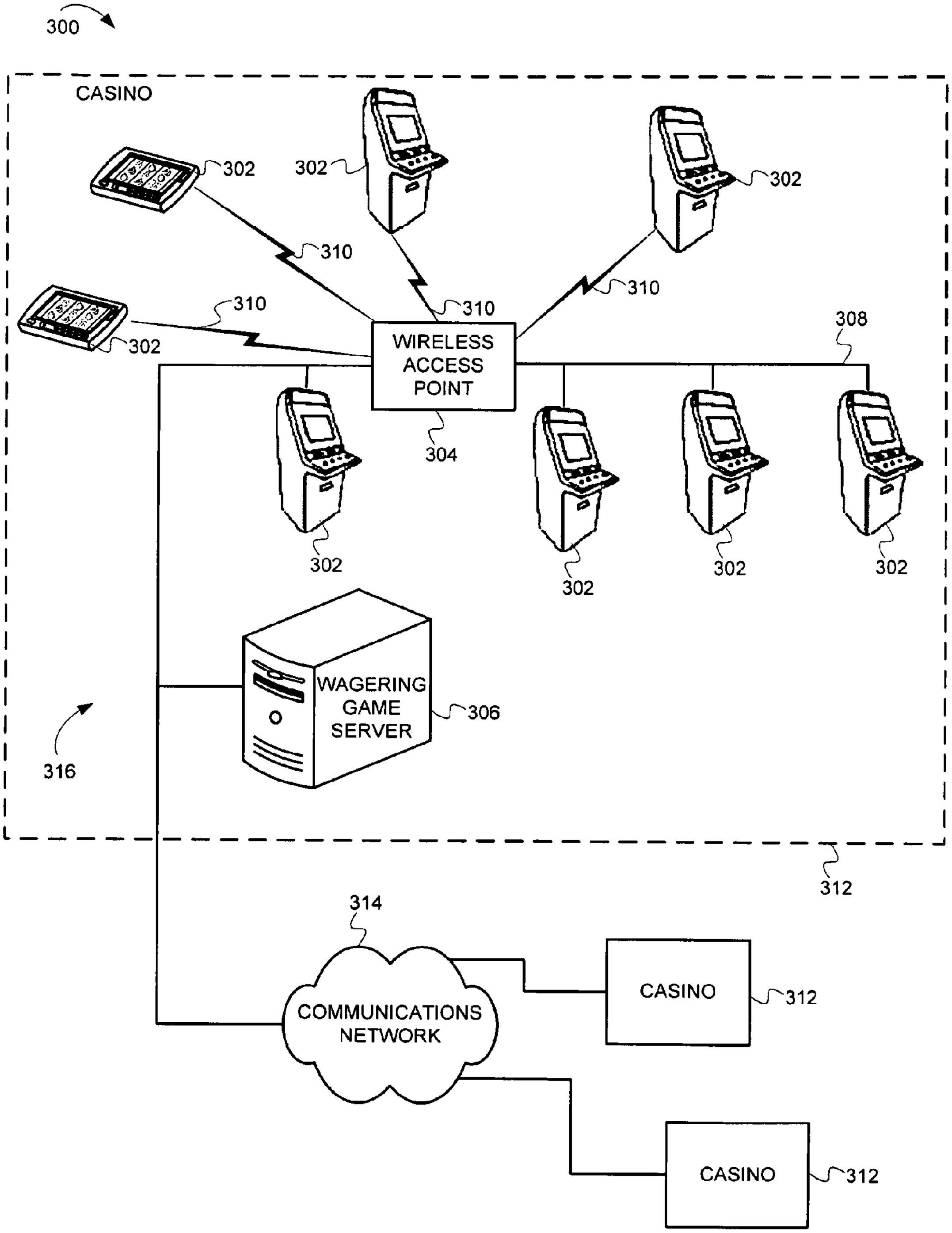
FIG. 3 is a block diagram of a networked system of wagering game machines and servers according to example embodiments.

Wagering game software 132 may be loaded from storage unit 130, or it may be loaded from external systems 104 such as servers of other systems on a wagering game network (as illustrated in FIG. 3). In general, wagering game software 132 comprises modules or units that operate to present one or more wagering games upon which monetary value may be wagered.

Some embodiments of the invention include an audio subsystem 120. Audio subsystem 120 provides audio capabilities to the wagering game machine and may comprise an audio amplifier coupled to speakers or an audio jack, and may further include an audio programming source on a memory such as a CD, DVD, flash memory etc.

In one embodiment, the wagering game machine 106 can include additional peripheral devices and/or more than one of each component shown in FIG. 1. For example, the peripherals may include a bill validator, a printer, a coin hopper, a button panel, or any of the many peripherals now found in wagering game machines or developed in the future. Further, in some embodiments, the wagering game machine 106 can include multiple external system interfaces 124 and multiple processors 126. In one embodiment, any of the components can be integrated or subdivided. Additionally, in one embodiment, the components of the wagering game machine 106 can be interconnected according to any suitable interconnection architecture (e.g., directly connected, hypercube, etc.).

In one embodiment, any of the components of the wagering game machine architecture 100 (e.g., the wagering game presentation unit 132 or portable wagering game management unit) can include hardware, firmware, and/or software for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

In operation, a player may use the portable wagering game machine to activate a play of a wagering game on the machine. Using the available input mechanisms such as value input device 114 or devices coupled through player input device 116, the player may select any variables associated with the wagering game and place his/her wager to purchase a play of the game. In a play of the game, the processor 126 generates at least one random event using a random number generator (RNG) and provides an award to the player for a winning outcome of the random event. Alternatively, the random event may be generated by a remote computer using an RNG or pooling schema and then transmitted to the wagering game machine. The processor 126 operates the displays 110 and 112 to represent the random event(s) and outcome(s) in a visual form that can be understood by the player. In some embodiments, a wagering game segment may be triggered based on certain events. For example, a bonus round may be triggered.

Figure 2:
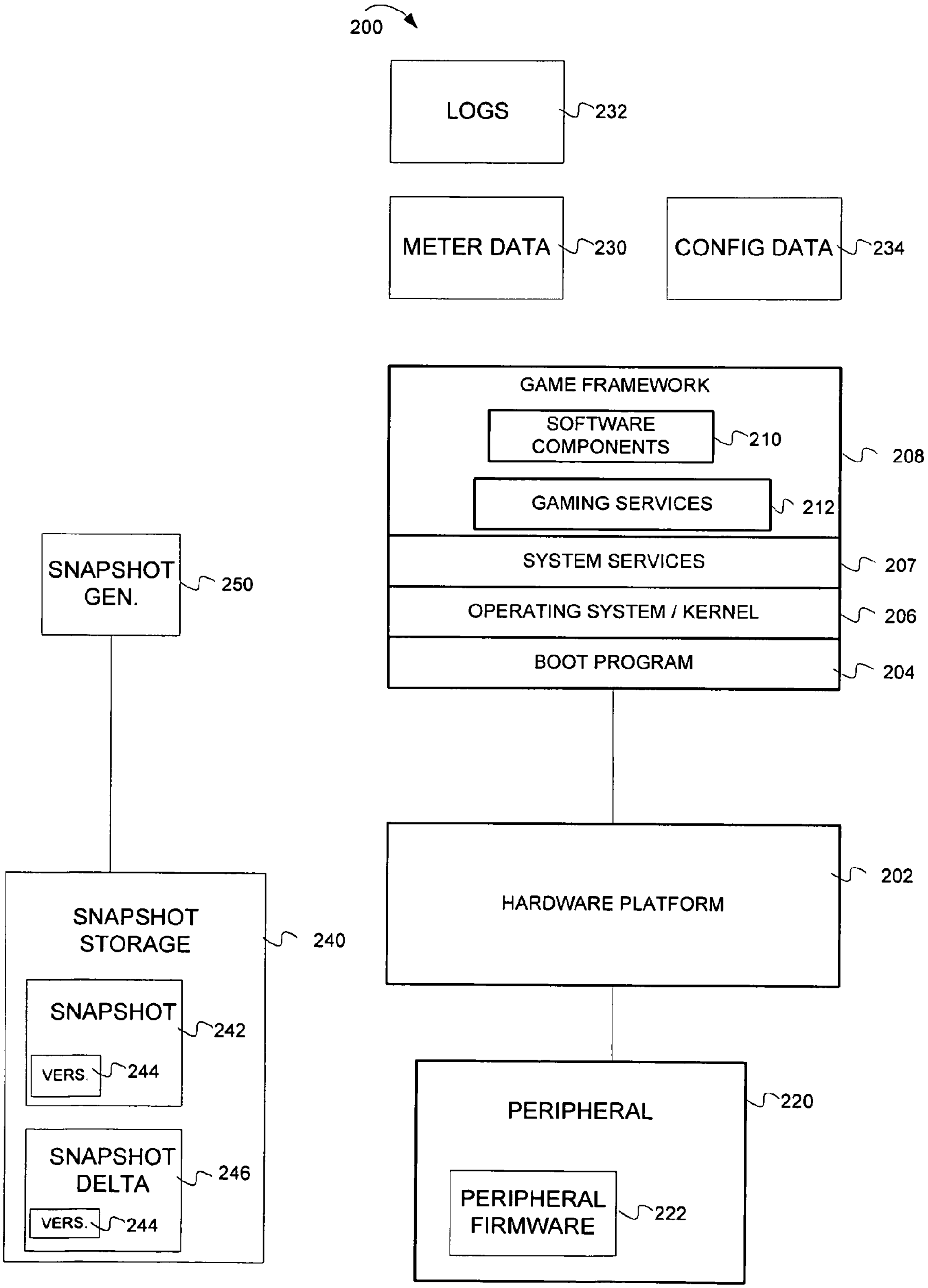
FIG. 2 is a block diagram of a software architecture for a wagering game machine according to an example embodiment.

FIG. 2 is a block diagram of a software architecture 200 for a wagering game machine according to an example embodiment. As shown in FIG. 2, the wagering game architecture includes a hardware platform 202, a boot program 204, an operating system 206, system services layer 207, and a game framework 208 that includes one or more wagering game software components 210 and/or game services 212. In various embodiments, the hardware platform 202 may include a thin-client, thick-client, or some intermediate derivation. The hardware platform 202 may also be configured to provide a virtual client. The boot program 204 may include a basic input/output system (BIOS) or other initialization program that works in conjunction with the operating system 206 to provide a software interface to the hardware platform 202. Hardware platform 202 may be coupled to one or more peripherals 220, including the peripherals described above with reference to FIG. 1. One or more of the peripherals 220 may utilize firmware 222 to control the operation of the peripheral. For example a ticket printer may use firmware to control how tickets are printed in response to print data sent by a wagering game.

System services layer 207 may include device drivers that provide an interface between wagering game framework 208 and the devices present on a wagering game machine. Further, system services layer 207 may include services such as database services, network related services or other generalized services available within the architecture.

The game framework 208 may include standardized game software components either independent or in combination with specialized or customized game software components that are designed for a particular wagering game. In one example embodiment, the wagering game software components 210 may include software operative in connection with the hardware platform 202 and operating system 206 to present wagering games, such as video poker, video black jack, video slots, video lottery, etc., in whole or part. According to another example embodiment, the software components 210 may include software operative to accept a wager from a player.

Game services 212 may include services that are used to support the operation of a wagering game or wagering game machine. For example, a rendering service, a hardware watchdog service or other wagering game related services may be provided within the game services layer 212.

In alternative example embodiments, one or more of the software components 210 or game services 212 may be provided as part of the operating system 206 or other software used in the wagering game system 200 (e.g., libraries, daemons, etc.).

In operation, the snapshot generator 250 may create periodic snapshots 242 of one or more of the software components described above. For example, a snapshot of some or all of a currently executing set of software may be taken (e.g. a prior to an upgrade). The snapshot 242 comprises a copy of the software and other data as of the time the snapshot was taken. The snapshot 242 may be stored on snapshot storage 240. Snapshot storage 240 may be a storage unit 130 (see FIG. 1), a partition of a hard drive storage unit, or it may be on a network attached storage device such as a server in a wagering game network (described below with reference to FIG. 3). The snapshot 242 may include a version identifier 244 that may be used to identify the version of a software component that is in the snapshot 242. Snapshots may also be taken just after an upgrade, or at periodic intervals. The snapshot data may be used to restore wagering game machine software as it existed at the point in time the snapshot was taken. Snapshot storage 240 may include a directory or directories of snapshots taken at various points in time. The number of snapshots 242 in a snapshot storage area 240 may be limited only by the amount of storage space available on the storage device for storage area 240.

During the operation of the wagering game machine, various data may be generated including meter data 230 and log data 232. Meter data 230 includes data representing the current credit values, win amount values, coin-in values, amount bet and other data regarding the state of the wagering game machine. Log data 232 includes data the may describe events that occurred on the wagering game machine such as error events, win events, jackpot events, machine restarts, software loads etc. Meter data 230 and log data 232 may be included in the snapshots 242.

Configuration data 234 may include data that determines which events generate a snapshot 242 and/or the intervals at which snapshots 242 are taken. Further, configuration data 234 may include data that determines which software and/or firmware components are included in a snapshot 242.

Further details on the operation of architecture 200 according to embodiments of the invention are provided below with reference to FIGS. 4 and 5.

While FIGS. 1 and 2 describe example embodiments of a wagering game machine hardware and software architecture, FIG. 3 shows how a plurality of wagering game machines can be connected in a wagering game network.

FIG. 3 is a block diagram illustrating a wagering game network 300, according to example embodiments of the invention. As shown in FIG. 3, the wagering game network 300 includes a plurality of casinos 312 connected to a communications network 314.

Each of the plurality of casinos 312 includes a local area network 316, which may include a wireless access point 304, wagering game machines 302, and a wagering game server 306 that can serve wagering games over the local area network 316. As such, the local area network 316 includes wireless communication links 310 and wired communication links 308. The wired and wireless communication links can employ any suitable connection technology, such as Bluetooth, 802.11, Ethernet, public switched telephone networks, SONET, etc. In one embodiment, the wagering game server 306 can serve wagering games and/or distribute content to devices located in other casinos 312 or at other locations on the communications network 314.

The wagering game machines 302 and wagering game server 306 can include hardware and machine-readable media including instructions for performing the operations described herein.

The wagering game machines 302 described herein can take any suitable form, such as floor standing models, handheld mobile units, bartop models, workstation-type console models, etc. Further, the wagering game machines 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention.

In various embodiments, wagering game machines 302 and wagering game servers 306 work together such that a wagering game machine 302 may be operated as a thin, thick, or intermediate client. For example, one or more elements of game play may be controlled by the wagering game machine 302 (client) or the wagering game server 306 (server). Game play elements may include executable game code, lookup tables, configuration files, game outcome, audio or visual representations of the game, game assets or the like. In a thin-client example, the wagering game server 306 may perform functions such as determining game outcome or managing assets, while the wagering game machine 302 may be used merely to present the graphical representation of such outcome or asset modification to the user (e.g., player). In a thick-client example, game outcome may be determined locally (e.g., at the wagering game machine 302) and then communicated to the wagering game server 306 for recording or managing a player's account. Thus as noted above, a server may be used to store snapshot data, or may be used to control or configure when snapshots are taken on a wagering game machine.

Similarly, functionality not directly related to game play may be controlled by the wagering game machine 302 (client) or the wagering game server 306 (server) in embodiments. For example, power conservation controls that manage a display screen's light intensity may be managed centrally (e.g., by the wagering game server 306) or locally (e.g., by the wagering game machine 302). Other functionality not directly related to game play may include presentation of advertising, software or firmware updates, system quality or security checks, etc.

Example Wireless Environment

In some embodiments, the wireless access point 304 can be part of a communication station, such as wireless local area network (WLAN) communication station including a Wireless Fidelity (WiFi) communication station, or a WLAN access point (AP). In these embodiments, the wagering game machines 302 can be part of a mobile station, such as WLAN mobile station or a WiFi mobile station.

In some other embodiments, the wireless access point 304 can be part of a broadband wireless access (BWA) network communication station, such as a Worldwide Interoperability for Microwave Access (WiMax) communication station, as the wireless access point 304 can be part of almost any wireless communication device. In these embodiments, the wagering game machines 302 can be part of a BWA network communication station, such as a WiMax communication station.

In some embodiments, any of the wagering game machines 302 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

In some embodiments, the wireless access point 304 and the wagering game machines 302 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 304 and the wagering game machines 302 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In other embodiments, the wireless access point 304 and the wagering game machines 302 can communicate in accordance with a short-range wireless standard, such as the Bluetooth™ short-range digital communication protocol.

It will be appreciated from the above that various components of a wagering game architecture and/or their functionality may be distributed in various manners. For example, all of the components and functionality may reside in a wagering game machine, or various portions may reside in part on a wagering game machine and in part on a server or other network attached device. The scope of the inventive subject matter is meant to include all of these environments.

Figure 4:
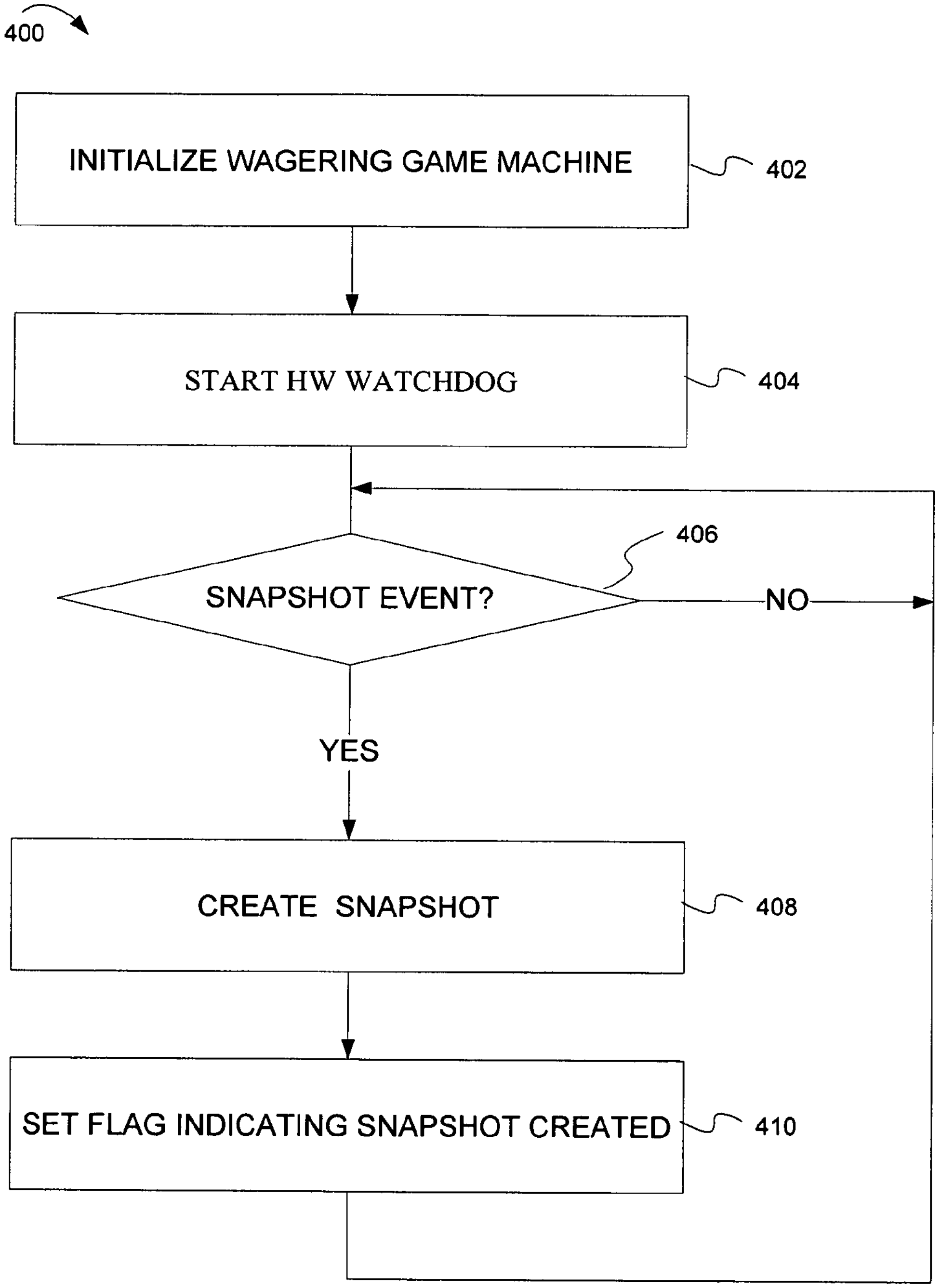
FIG. 4 is a flowchart illustrating methods for taking a snapshot of a software configuration for a wagering game machine according to example embodiments of the invention.

FIG. 4 is a flowchart illustrating a method 400 for resizing graphical images for a wagering game machine according to example embodiments. The methods to be performed by an operating environment such as control system 100, software architecture 200, and network system 300 constitute computer programs made up of computer-executable instructions. Describing the methods by reference to a flowchart enables one skilled in the art to develop such programs including such instructions to carry out the method on suitable processors for gaming machines (the processor or processors of the computer executing the instructions from computer-readable media). The methods illustrated in FIG. 4 are inclusive of acts that may be taken by an operating environment executing an exemplary embodiment of the invention.

In some embodiments, method 400 begins at block 402 by initializing the operation of a wagering game machine. In some embodiments, the memory (e.g., RAM memory) is cleared prior to booting or loading software into the main memory of the wagering game machine. Software may be loaded during the initialization process after the RAM clear. For example, BIOS software may be executed and software may be loaded from one or more sources, including storage unit(s) 130, or from network sources.

After the wagering game machine has completed initialization and reached a safe state, at block 404 the system, in some embodiments, starts a hardware watchdog. The hardware watchdog monitors the state of one or more hardware components and/or detects hardware failures in a wagering game machine to determine if the wagering game machine is capable of properly executing wagering game applications.

At block 406, a system executing the method determines whether a snapshot event has occurred such that a snapshot should be generated. Various types of snapshot events are possible and within the scope of the inventive subject matter. For example, a snapshot event may occur when the wagering game machine has reached a safe state after the initialization performed at block 402. Snapshots may be taken at various stages in the initialization. For example, snapshots may be taken when after peripheral firmware has been successfully initiated, after the operating system/kernal software has been successfully initiated, after system services have been initiated, after gaming services have been initiated, and/or after wagering game applications have been initiated.

A snapshot event may occur when software is upgraded or modified on the wagering game machine or when a configuration is upgraded or modified. For example, a snapshot may be created after the software has been upgraded. Further, the upgrade event may cause two snapshots to be taken, a first snapshot just prior to the upgrade, and a second snapshot after the upgrade has been successfully completed.

A snapshot event may occur based on wagering game events. For example, a jackpot or large win (e.g. a win over a predetermined threshold amount) may trigger a snapshot.

A snapshot event may occur after the passage of a certain amount of time. For example, a snapshot may be scheduled to occur on an hourly, daily, weekly or other periodic basis.

The snapshot event may be an error event. For example, a snapshot may occur upon the detection of data corruption of a payout error. Further, the hardware watchdog may generate a snapshot event. For example, the hardware watchdog may detect the failure or the imminent failure of a hardware device on the wagering game machine. A snapshot may be taken to preserve the software state of the wagering game machine.

Upon the occurrence of snapshot event, the system creates a snapshot at block 408. The snapshot may include a variety of different components of the wagering game machine. For example, the snapshot may include software components of a wagering game application, a wagering game software framework, operating system software, peripheral firmware, meter data, log data, backplane memory contents, SPI memory contents, RAM contents, processor state, etc. In some embodiments, the snapshot data may also include a version number identifying the version of the component, data structure, or other memory contents included in the snapshot. The version data may also include the version of the software used to create the snapshot. In addition, the system may generate a log entry to indicate that the snapshot has been taken. The log entry may be written to a log of snapshot events, or a log of system events. In some embodiments, the log may be maintained on a server 306, such as an AOM (Administration, Operations and Maintenance) server. Additionally, at block 410 a flag or flags may be set in memory such as NVRAM to indicate that a snapshot for a particular initialization stage has been successfully generated.

In some embodiments, the snapshot data may be referred to as a snapshot delta. In this case, an initial snapshot comprises a full snapshot of software and firmware components of a wagering game machine. A snapshot delta (e.g., snapshot delta 246) comprises includes only those components that have changed or data that has been committed since the previous snapshot. Timestamps and/or version numbers may be used to determine if a component has changed since the previous snapshot.

In some embodiments, certain software components may be excluded from the snapshot. For example, BIOS software, game flash memory, operating system flash memory etc. may not be included in the snapshot. This may be desirable because the size of the snapshot may be reduced by excluding components that are not likely or not capable of being changed or upgraded.

Figure 5:
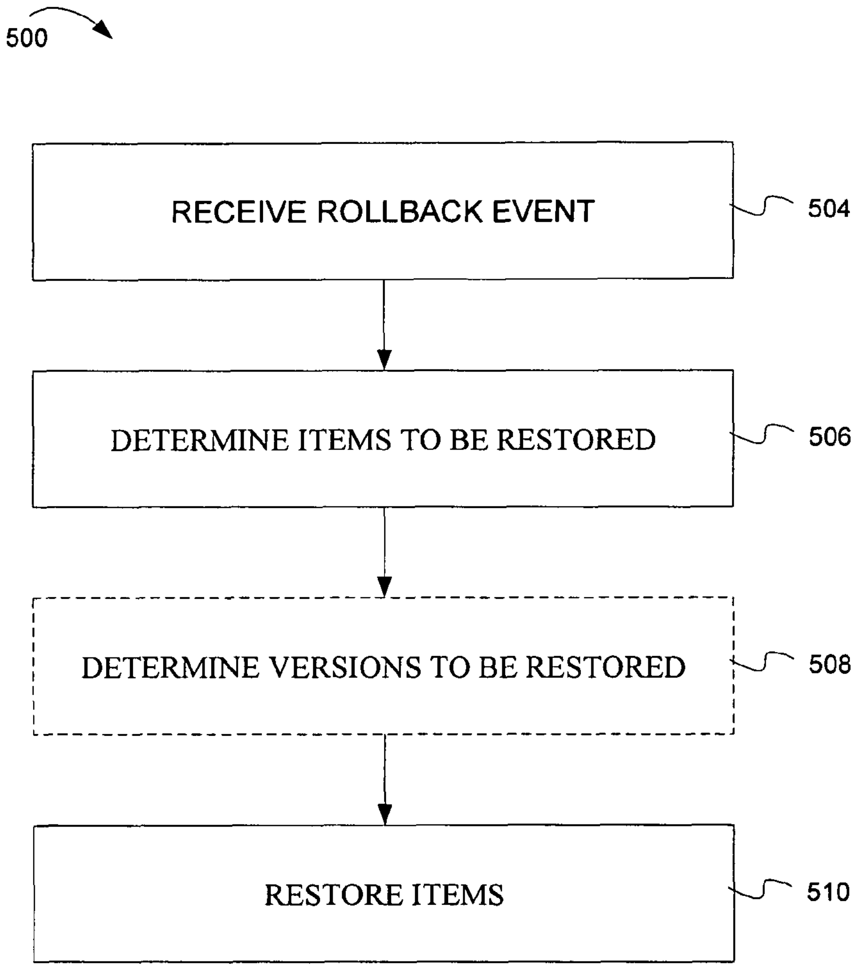
FIG. 5 is a flowchart illustrating methods for restoring a software configuration for a wagering game machine to a previous state according to example embodiments of the invention.

FIG. 5 is a flowchart illustrating a method 500 for restoring software components to a wagering game machine from a previous snapshot. The process of restoring a wagering game machine from a snapshot may be referred to as rolling back. In other words, the updates or changes are rolled back to a previous point in time (e.g., the time of a snapshot) such that the wagering game machine operates as if the change or upgrade did not occur. In some embodiments, the method begins at block 504 by receiving an indication of a rollback event. The rollback event may be automatically generated, for example, in response to a hardware failure or an upgrade failure. Alternatively, the rollback event may by generated by an operator or a technician that desires to rollback the software on the wagering game machine to a prior snapshot.

At block 506 the system determines which components are to be rolled back, i.e. restored from the snapshot data. In some embodiments, the rollback may be selective in that some components and/or data may be excluded from the rollback. For example, accounting data (e.g. credits, cash-in, cash-out), ticket sequence numbers, log data, or any other data that must be maintained on an on-going basis may be excluded from the rollback, because rolling back such data may lead to undesirable results. For example, rolling back accounting data could lead to accounting errors and rolling back ticket sequence numbers could lead to duplicate ticket numbers being generated. Rolling back log data may lead to the loss of log entries after the snapshot was taken. However, it should be noted that in some instances, it may be desirable to rollback such data. For example, a rollback to a previous snapshot may be used to perform forensic or post-mortem analysis in the case of a software failure or machine crash. In these cases, it may be desirable to include rollback accounting data, log data, ticket sequence numbers etc. in order to more accurately reflect the state of the machine at the time of the error. In some embodiments, an interface may be provided that allows an operator or technician to select the components and data that are to be rolled back.

At block 508, the system determines which versions are to be rolled back. For example, in some embodiments, the components to be rolled back may have different versions depending on configuration or platforms. The system may use version identifiers to properly select the components from the snapshot data that are to be restored. Similarly, version identifiers may determine whether or not the component is rolled back. In some embodiments, if the current version identifier is the same as the identifier of the component to be rolled back, the rollback is allowed. Otherwise, if the versions do not match, the system may check to see if the jurisdiction allows the snapshot version. If so, the rollback may be allowed. Further, the system may check to make sure that the snapshot version and the current version are compatible. If not, the rollback is not allowed. In some embodiments, a warning may be displayed on a user interface in the case that a rollback will not be allowed.

At block 510, the selected components and data are restored to the wagering game machine. The wagering game machine may then be rebooted or otherwise reinitialized with the software and/or data from the snapshot.

It should be noted that the wagering game machine need not be the one that generated the snapshot. For example, a snapshot taken on one wagering game machine may be rolled back (i.e., restored) to another wagering game machine. This may be useful in order to duplicate an execution environment in a lab for debugging or development purposes, or for post-crash analysis after a hardware or software failure occurs on a wagering game machine.

Example Wagering Game Machine

Figure 6:
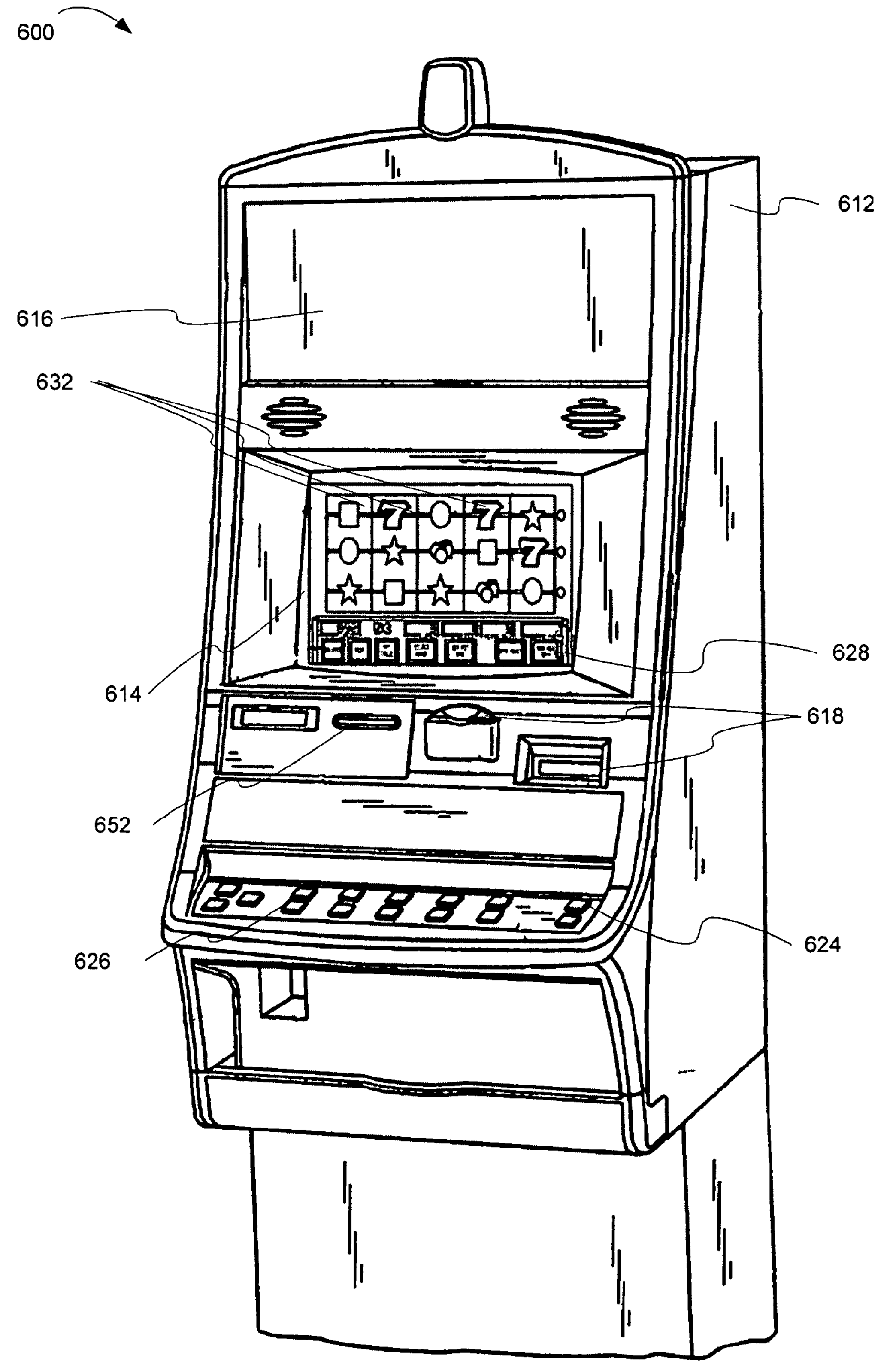
FIG. 6 is a perspective view of a wagering game machine, according to example embodiments of the invention.

FIG. 6 is a perspective view of a wagering game machine, according to example embodiments of the invention. Referring to FIG. 6, a wagering game machine 600 is used in gaming establishments, such as casinos. According to embodiments, the wagering game machine 600 can be any type of wagering game machine and can have varying structures and methods of operation. For example, the wagering game machine 600 can be an electromechanical wagering game machine configured to play mechanical slots, or it can be an electronic wagering game machine configured to play video casino games, such as blackjack, slots, keno, poker, blackjack, roulette, etc.

The wagering game machine 600 comprises a housing 612 and includes input devices, including value input devices 618 and a player input device 624. For output, the wagering game machine 600 includes a primary display 614 for displaying information about a basic wagering game. The primary display 614 can also display information about a bonus wagering game and a progressive wagering game. The wagering game machine 600 also includes a secondary display 616 for displaying wagering game events, wagering game outcomes, and/or signage information. While some components of the wagering game machine 600 are described herein, numerous other elements can exist and can be used in any number or combination to create varying forms of the wagering game machine 600.

The value input devices 618 can take any suitable form and can be located on the front of the housing 612. The value input devices 618 can receive currency and/or credits inserted by a player. The value input devices 618 can include coin acceptors for receiving coin currency and bill acceptors for receiving paper currency. Furthermore, the value input devices 618 can include ticket readers or barcode scanners for reading information stored on vouchers, cards, or other tangible portable storage devices. The vouchers or cards can authorize access to central accounts, which can transfer money to the wagering game machine 600.

The player input device 624 comprises a plurality of push buttons on a button panel 626 for operating the wagering game machine 600. In addition, or alternatively, the player input device 624 can comprise a touch screen 628 mounted over the primary display 614 and/or secondary display 616.

The various components of the wagering game machine 600 can be connected directly to, or contained within, the housing 612. Alternatively, some of the wagering game machine's components can be located outside of the housing 612, while being communicatively coupled with the wagering game machine 600 using any suitable wired or wireless communication technology.

The operation of the basic wagering game can be displayed to the player on the primary display 614. The primary display 614 can also display a bonus game associated with the basic wagering game. The primary display 614 can include a cathode ray tube (CRT), a high resolution liquid crystal display (LCD), a plasma display, light emitting diodes (LEDs), or any other type of display suitable for use in the wagering game machine 600. Alternatively, the primary display 614 can include a number of mechanical reels to display the outcome. In FIG. 6, the wagering game machine 600 is an "upright" version in which the primary display 614 is oriented vertically relative to the player. Alternatively, the wagering game machine can be a "slant-top" version in which the primary display 614 is slanted at about a thirty-degree angle toward the player of the wagering game machine 600. In yet another embodiment, the wagering game machine 600 can exhibit any suitable form factor, such as a free standing model, bartop model, mobile handheld model, or workstation console model. Further, in some embodiments, the wagering game machine 600 may be include an attached chair assembly, and may include audio speakers designed to provide an enhanced audio environment. For example, a "surround sound" system may be included as part of the wagering game machine and may be integrated with the attached chair.

A player begins playing a basic wagering game by making a wager via the value input device 618. The player can initiate play by using the player input device's buttons or touch screen 628. The basic game can include arranging a plurality of symbols along a payline 632, which indicates one or more outcomes of the basic game. Such outcomes can be randomly selected in response to player input. At least one of the outcomes, which can include any variation or combination of symbols, can trigger a bonus game.

In some embodiments, the wagering game machine 600 can also include an information reader 652, which can include a card reader, ticket reader, bar code scanner, RFID transceiver, or computer readable storage medium interface. In some embodiments, the information reader 652 can be used to award complimentary services, restore game assets, track player habits, etc.

Example Portable Wagering Game Machine

Figure 7:
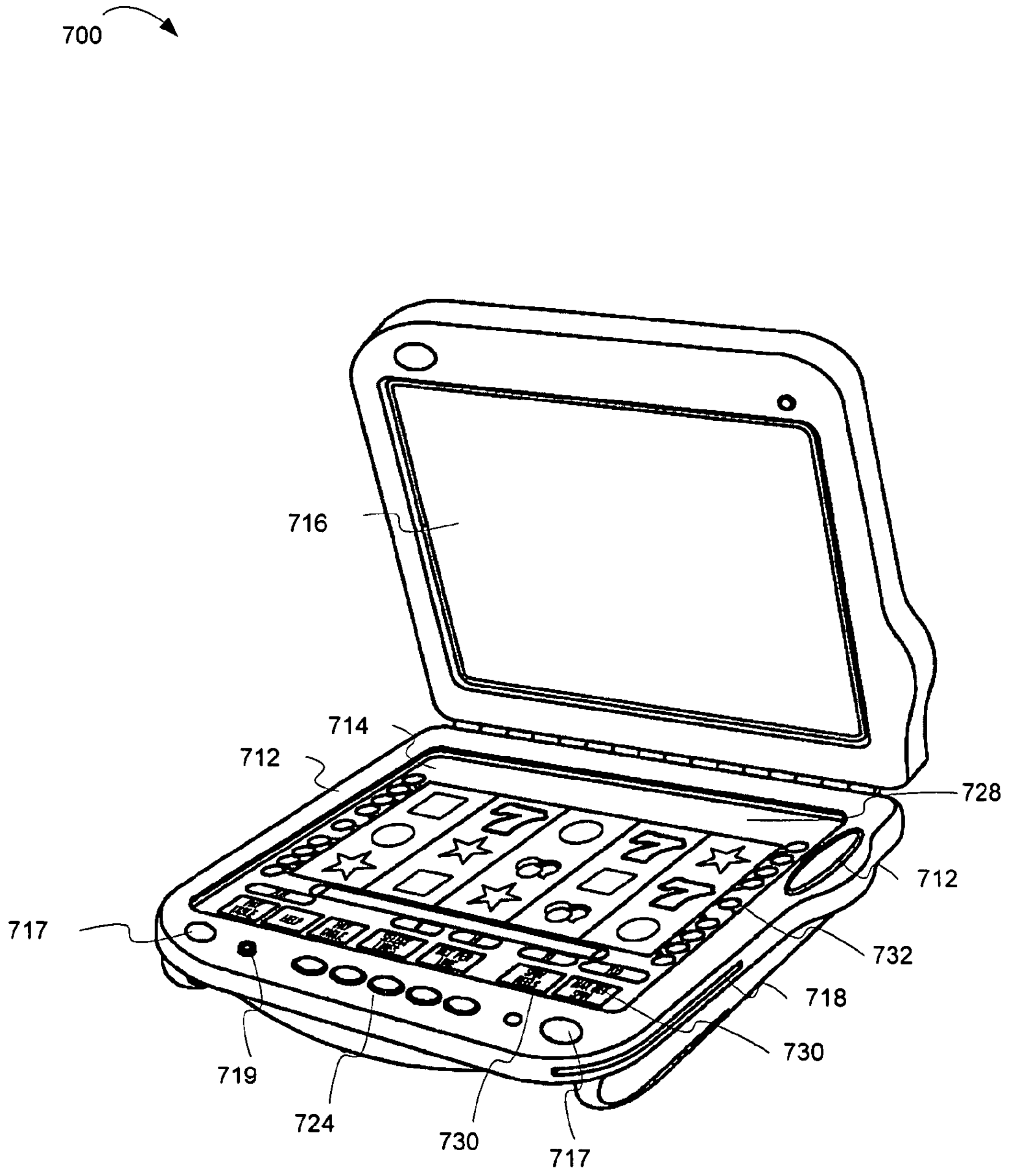
FIG. 7 is a perspective view of a portable wagering game machine according to an example embodiment.

FIG. 7 shows an example embodiment of a portable wagering game machine 700. The portable wagering game machine 700 can include any suitable electronic handheld or mobile device configured to play a video casino game such as blackjack, slots, keno, poker, blackjack, and roulette. The wagering game machine 700 comprises a housing 712 and includes input devices, including a value input device 718 and a player input device 724. For output, the wagering game machine 700 includes a primary display 714, and may include a secondary display 716, one or more speakers 717, one or more player-accessible ports 719 (e.g., an audio output jack for headphones, a video headset jack, etc.), and other conventional I/O devices and ports, which may or may not be player-accessible. In the embodiment depicted in FIG. 7, the wagering game machine 700 includes a secondary display 716 that is rotatable relative to the primary display 714. The optional secondary display 716 can be fixed, movable, and/or detachable/attachable relative to the primary display 714. Either the primary display 714 and/or secondary display 716 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 718 can comprise, for example, a slot located on the front, side, or top of the casing 712 configured to receive credit from a stored-value card (e.g., casino card, smart card, debit card, credit card, etc.) inserted by a player. The player-accessible value input device 718 can also comprise a sensor (e.g., an RF sensor) configured to sense a signal (e.g., an RF signal) output by a transmitter (e.g., an RF transmitter) carried by a player. The player-accessible value input device 718 can also or alternatively include a ticket reader, or barcode scanner, for reading information stored on a credit ticket, a card, or other tangible portable credit or funds storage device. The credit ticket or card can also authorize access to a central account, which can transfer monetary value to the wagering game machine 700.

Still other player-accessible value input devices 718 can require the use of touch keys 730 on the touch-screen display (e.g., primary display 714 and/or secondary display 716) or player input devices 724. Upon entry of player identification information and, preferably, secondary authorization information (e.g., a password, PIN number, stored value card number, predefined key sequences, etc.), the player can be permitted to access a player's account. As one potential optional security feature, the wagering game machine 700 can be configured to permit a player to only access an account the player has specifically set up for the wagering game machine 700. Other conventional security features can also be utilized to, for example, prevent unauthorized access to a player's account, to minimize an impact of any unauthorized access to a player's account, or to prevent unauthorized access to any personal information or funds temporarily stored on the wagering game machine 700.

The player-accessible value input device 718 can itself comprise or utilize a biometric player information reader which permits the player to access available funds on a player's account, either alone or in combination with another of the aforementioned player-accessible value input devices 718. In an embodiment wherein the player-accessible value input device 718 comprises a biometric player information reader, transactions such as an input of value to the wagering game machine 710, a transfer of value from one player account or source to an account associated with the wagering game machine 700, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 718 comprising a biometric player information reader can require a confirmatory entry from another biometric player information reader 752, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with an authentication fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 718 can be provided remotely from the wagering game machine 710.

The player input device 724 may include a plurality of push buttons on a button panel for operating the wagering game machine 700. In addition, or alternatively, the player input device 724 can comprise a touch screen mounted to the primary display 714 and/or secondary display 716. In one aspect, the touch screen is matched to a display screen having one or more selectable touch keys 730 selectable by a user's touching of the associated area of the screen using a finger or a tool, such as a stylus pointer. A player enables a desired function either by touching the touch screen at an appropriate touch key 730 or by pressing an appropriate push button on the button panel. The touch keys 730 can be used to implement the same functions as push buttons. Alternatively, the push buttons 726 can provide inputs for one aspect of the operating the game, while the touch keys 730 can allow for input needed for another aspect of the game. The various components of the wagering game machine 700 can be connected directly to, or contained within, the casing 712, as seen in FIG. 7, or can be located outside the casing 712 and connected to the casing 712 via a variety of wired (tethered) or wireless connection methods. Thus, the wagering game machine 700 can comprise a single unit or a plurality of interconnected (e.g., wireless connections) parts which can be arranged to suit a player's preferences.

The operation of the basic wagering game on the wagering game machine 700 is displayed to the player on the primary display 714. The primary display 714 can also display a bonus game associated with the basic wagering game. The primary display 714 preferably takes the form of a high resolution LCD, a plasma display, an LED, or any other type of display suitable for use in the wagering game machine 700. The size of the primary display 714 can vary from, for example, about a 2-3" display to a 15" or 17" display. In at least some embodiments, the primary display 714 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 714 and/or secondary display 716 can have a 16:9 aspect ratio or other aspect ratio (e.g., 4:3). The primary display 714 and/or secondary display 716 can also each have different resolutions, different color schemes, and different aspect ratios.

A player typically begins play of the basic wagering game on the wagering game machine 700 by making a wager (e.g., via the value input device 718 or an assignment of credits stored on the portable wagering game machine 700 via the touch screen keys 730, player input device 724, or buttons 726) on the wagering game machine 700. In some embodiments, the basic game can comprise a plurality of symbols arranged in an array, and includes at least one payline 732 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 718 of the wagering game machine 700 can double as a player information reader 752 that allows for identification of a player by reading a card with information indicating the player's identity (e.g., reading a player's credit card, player ID card, smart card, etc.). The player information reader 752 can alternatively or also comprise a bar code scanner, RED transceiver or computer readable storage medium interface. In one embodiment, the player information reader 752 comprises a biometric sensing device.

In some embodiments, a portable wagering game machine 700 can part of a portable wireless communication device, such as a personal digital assistant (PDA), a laptop or portable computer with wireless communication capability, a web tablet, a wireless telephone, a wireless headset, a pager, an instant messaging device, a digital camera, a television, or other device that can receive and/or transmit information wirelessly.

CONCLUSION

Systems and methods for selectively taking snapshots and rolling back wagering game machine software and data have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the inventive subject matter.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:

1. A computer-implemented method of capturing a state of a wagering game machine while the wagering game machine is presenting wagering game, the method comprising:

determining, via at least one of one or more processors, that an award event has occurred in the wagering game on the wagering game machine;

in direct response to the award event, creating a snapshot of one or more executable software components and data of the wagering game machine, the snapshot comprising a copy of the one or more executable software components and data installed on the wagering game machine at the point in time the snapshot is created;

saving the snapshot in one or more memory devices;

receiving, via at least one of the one or more processors, a rollback indication;

upon receiving the rollback indication, selecting a snapshot to restore; and restoring, via at least one of the one or more processors, one or more executable software components and data from the snapshot, wherein the restoring excludes restoring critical data, the critical data comprising accounting data or meter data.

2. The computer-implemented method of claim 1, wherein the award event includes winning a jackpot.

3. The computer-implemented method of claim 1, wherein the award event includes winning an award that exceeds a predetermined threshold amount.

4. The computer-implemented method of claim 1, wherein the snapshot is stored in one or more memory storage devices that reside on a system other than the wagering game machine.

5. The computer-implemented method of claim 1, further comprising generating a log entry upon creating the snapshot.

6. The computer-implemented method of claim 1, further comprising starting a hardware watchdog process operable to generate an error event indicative of a hardware failure.

7. The computer-implemented method of claim 1, wherein restoring one or more components includes restoring the one or more executable software components and data to a system different from the wagering game machine for execution on the different system.

8. The computer-implemented method of claim 1, and further comprising selecting the one or more of the executable software components or data to restore.

9. The computer-implemented method of claim 1, wherein selecting the executable software components or data comprises receiving a selection from a user interface, 10. The computer-implemented method of claim 8, wherein selecting the executable software components comprises determining a version of an executable software component to restore in accordance with a version identifier.

11. A gaming system configured to capture a state of a wagering game machine while the wagering game machine is presenting a wagering game, the gaming system comprising:

one or more processors; and one or more memory storage devices storing instructions that, when executed by at least one of the one or more processors, cause the gaming system to:

determine that an award event has occurred in the wagering game on the wagering game machine;

in direct response to the award event, create a snapshot of one or more execs table software components and data of the wagering game machine, the snapshot comprising a copy of the one or more executable software components and data installed on the wagering game machine at the point in time the snapshot is created;

save the snapshot in one or more memory devices; receive a rollback indication;

upon receiving the rollback indication, select a snapshot to restore; and restore one or more executable software components and data from the snapshot, wherein the restoring excludes restoring critical data, the critical data comprising accounting data or meter data.

12. The gaming system of claim 11, wherein the snapshot is stored in a partition of a hard drive.

13. The gaming system of claim 11, wherein the snapshot data includes data obtained from one or more of a RAM (Random Access Memory), flash memory, compact flash memory, SPI interface memory or backplane memory.

14. A computer-readable, non-transitory medium having stored thereon computer-executable instructions that, when executed by one or more processors, cause a gaming machine to perform a method comprising:

determining that an award event has occurred in a wagering game on the wagering game machine;

in direct response to the award event, creating a snapshot of one or more executable software components and data of the wagering game machine, the snapshot comprising a copy of the one or more executable software components and data installed on the wagering game machine at the point in time the snapshot is created;

saving the snapshot in one or more memory devices;

receiving a rollback indication;

upon receiving the rollback indication, selecting a snapshot to restore; and restoring one or more executable software components and data from the snapshot, wherein the restoring excludes restoring critical data, the critical data comprising accounting data or meter data.

15. The computer-readable medium of claim 14, wherein the award event includes winning a jackpot.

16. The computer-readable medium of claim 14, wherein restoring one or more executable software components and data farther includes restoring the one or more executable software components and data to a system different from the wagering game machine for execution on the different system.

17. The computer-readable medium of claim 14, wherein the method further comprises selecting the one or more executable software components to restore.

18. The computer-readable medium of claim 17, wherein selecting the executable software components comprises receiving a selection from a user interface.

19. The computer-readable medium of claim 17, wherein selecting the executable software components comprises determining a version of an executable software component to restore in accordance with a version identifier.

* * * * *